_United States Patent Office_

2,698,328
Patented Dec. 28, 1954

2,698,328

GAMMA PYRIDINE ALDEHYDE HYDRATE AND METHOD OF ISOLATION

Wilhelm Mathes and Walter Sauermilch, Ludwigshafen (Rhine), Germany, assignors to Dr. F. Raschig G. m. b. H., Ludwigshafen (Rhine), Germany No Drawing. Application June 10, 1952, Serial No. 292,748

Claims priority, application Germany June 25, 1951

4 Claims. (Cl. 260—297)

The present invention relates to the production of a novel gamma pyridine aldehyde hydrate and to a method of isolating the same from pyridine aldehyde mixtures containing gamma pyridine aldehyde.

Prior to the discovery of the process for the production of pyridine aldehydes described in our copending application Serial No. 251,624, filed October 16, 1951, now abandoned, pyridine aldehydes were only obtainable by very complicated processes with a very poor yield. The amounts produced evidently were so small that they did not even suffice for the purification or recrystallization thereof, as the data given in the literature for even the simplest derivatives varies considerably from what we have ascertained. Consequently, little is known concerning the pyridine aldehydes and derivatives thereof.

It has now been unexpectedly found that gamma pyridine aldehyde reacts with water to produce a solid relatively water insoluble hydrate whereas the alpha, beta as well as the 6-methyl alpha pyridine aldehydes do not form such hydrate. The presence of a slight excess of water does not in itself prevent the crystallization of the hydrate, as it is relatively insoluble in water.

The gamma pyridine aldehyde hydrate is substantially more stable than the free aldehyde and, consequently, is more suitable as a commercial product. It furthermore possesses hyperemic action and is suited as a pharmaceutical product as well as an intermediate in the production of such products. As only the gamma pyridine aldehyde forms a hydrate, the formation thereof can be made use of in separating gamma pyridine aldehyde from admixtures with other pyridine aldehydes. The gamma pyridine aldehyde can be recovered from its hydrate by heating preferably under vacuum to prevent decomposition.

The formation of the gamma pyridine aldehyde hydrate is preferably accomplished by adding just sufficient water to gamma pyridine aldehyde or mixtures of gamma pyridine aldehyde and other pyridine aldehydes for the formation of the gamma pyridine aldehyde hydrate and cooling to effect crystallization of the solid gamma pyridine aldehyde hydrate.

Temperatures between 20° C. and 0° C. are suitable for the formation of the solid hydrate and in some instances, it is advisable to seed and rub or agitate the mixture to induce crystallization.

The following examples will serve to illustrate the manner in which the process according to the invention can be carried out.

*Example 1*

The vapors of 350 ccm. of a 3.5% aqueous solution of a commercial beta picoline mixture in admixture with 50 liters of air were passed at 410° C. per hour over 100 ccm. of a catalyst composed of 90% of iron-free silica gel and 10% of a 30/70 mixture of $MoO_3$ and $V_2O_5$ arranged in an aluminum catalyst chamber. The beta picoline mixture which had a boiling point range between 142.5° and 145° C. contained gamma picoline and 2,6 lutidine in addition to beta picoline. The reaction vapors leaving the catalyst chamber were condensed and a blue-green liquid was obtained which had a strong reducing action upon an ammoniacal silver nitrate solution.

5 liters of the condensate were acidified with 0.5 liters of concentrated HCl and after the addition of some active carbon, it was filtered. The clear filtrate was concentrated by vacuum evaporation until a specific gravity of 1.10 was reached. Thereupon a sufficient quantity of ammonia (diluted 1 to 3) was added so that a pH to 6.5 was just reached. The resulting solution contained free beta and gamma pyridine aldehydes as well as free 6 methyl 2 pyridine aldehyde and a small quantity of 2,6 pyridine dialdehyde. The solution was shaken out twice with an equal quantity of chloroform and the chloroform extracts which contained the aldehydes were combined and subjected to fractional distillation at normal pressure until the concentration of the aldehydes and excess picoline bases reached about 30 to 50% and the distillation was then continued under medium vacuum to prevent high distillation temperatures to remove the remaining chloroform. Upon further fractional distillation under vacuum 40–45 grams of picoline bases were obtained as first runnings and thereafter 40–45 grams of pyridine aldehydes were obtained. 5 ccs. of water were added to the resulting mixture of pyridine aldehydes and upon seeding and cooling to 0° C., the gamma pyridine aldehyde hydrate began to crystallize out. The crystallization was completed after several hours. The crystals were separated from the remaining liquid by filtering and weighed about 20 grams and had a melting point of 75–78° C. The filtrate was then subjected to a vacuum fractional distillation whereby the additional water was first removed and then after a first running of excess picoline, the 6-methyl alpha pyridine aldehyde with some 4-pyridine aldehyde, substantially pure beta pyridine aldehyde and 2,6 pyridine dialdehyde were obtained.

The boiling points and melting points of the pure substances are as follows:

6-methyl-alpha-pyridine aldehyde: Boiling point 12 mm. Hg 77–78° C., melting point 33° C.

Betapyridine aldehyde: Boiling point 13 mm. Hg. 85–90° C., liquid.

2,6 pyridine dialdehyde: Boiling point 100 mm. Hg. 151–152° C., after subsequent sublimation melting point 124° C.

*Example 2*

10 liters of the blue-green condensate obtained according to Example 1 were shaken with 7 liters and then with 3 liters of chloroform. The resulting chloroform extract was fractionally distilled as in Example 1, whereby 223 grams of picoline bases, which had not reacted, and 158 grams of pyridine aldehydes were recovered. Upon addition of 20 ccs. of water to the pyridine aldehyde mixture, seeding and allowing to stand cold, 73 grams of the solid gamma pyridine aldehyde hydrate were obtained. The filtrate was treated in the same manner as in Example 1 to recover the various compounds therein.

To recover the gamma pyridine aldehyde from its hydrate, the hydrate was heated under vacuum, and after the water distilled off with slight quantities of the aldehyde, the pure water free gamma pyridine aldehyde distilled over at 77–78° C. under a pressure of 12 mm. Hg.

The chloroform extraction of the aqueous pyridine aldehyde solutions can also be effected by a continuous counter-current extraction.

We claim:

1. A process for separating the gamma pyridine aldehyde fraction from its admixtures with other pyridine aldehydes which comprises treating such admixture with a quantity of water which is substantially molar with respect to said gamma pyridine aldehyde fraction, permitting the resulting gamma pyridine aldehyde hydrate to crystallize at temperatures between 0° and 20° C. and separating such crystalline gamma pyridine aldehyde hydrate from the remaining liquid.

2. A process of working up crude aqueous admixtures of pyridine aldehydes containing gamma pyridine aldehyde and corresponding pyridine bases which comprises extracting such crude admixture with chloroform, distilling chloroform off from the resulting extract and then fractionally distilling the remainder under vacuum to produce a fraction substantially composed of the pyridine bases and a fraction substantially composed of the pyridine aldehydes, adding a quantity of water to the pyridine aldehyde fraction which is substantially molar with respect to the gamma pyridine aldehyde contained therein, permitting the resulting gamma pyridine aldehyde hydrate to crystallize at temperatures between 0° and 20° C. and separating such crystalline gamma pyridine aldehyde hydrate from the remaining liquid.

3. A process for separating the gamma pyridine aldehyde fraction from its admixtures with other pyridine aldehydes which comprises treating such admixture with a quantity of water which is substantially molar with respect to said gamma pyridine aldehyde fraction, agitating the resulting solution to induce crystallization of gamma pyridine aldehyde hydrate and permitting the resulting gamma pyridine aldehyde hydrate to crystallize at temperatures between 0° and 20° C. and separating such crystalline gamma pyridine aldehyde hydrate from the remaining liquid.

4. A process for separating the gamma pyridine aldehyde fraction from its admixtures with other pyridine aldehydes which comprises treating such admixture with a quantity of water which is substantially molar with respect to said gamma pyridine aldehyde fraction, seeding the resulting solution with gamma pyridine aldehyde hydrate to induce crystallization of gamma pyridine aldehyde hydrate contained in such solution and permitting the resulting gamma pyridine aldehyde hydrate to crystallize at temperatures between 0° and 20° C. and separating such crystalline gamma pyridine aldehyde hydrate from the remaining liquid.

References Cited in the file of this patent

Chem. Abstracts, Vol. 40, col. 3448 (1946).